B. B. SCHNEIDER.

Lamp.

No. 8,066. Reissued Jan. 29, 1878.

Witnesses:

P. C. Dieterich

Frank Duffy

Inventor:

Bennett B. Schneider

Per C. H. Watson & Co. Attorneys.

N. PETERS, PHOTO-LITHOGRAPHER, WASHINGTON, D. C.

UNITED STATES PATENT OFFICE.

BENNETT B. SCHNEIDER, OF NEW YORK, N. Y.

IMPROVEMENT IN LAMPS.

Specification forming part of Letters Patent No. 167,128, dated August 24, 1875; Reissue No. 8,066, dated January 29, 1878; application filed December 18, 1877.

DIVISION A.

*To all whom it may concern:*

Be it known that I, BENNETT B. SCHNEIDER, of New York city, in the county of New York and State of New York, have invented certain new and useful Improvements in Lamps; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to that kind of lamp which has an oil-reservoir with a valve in the bottom, and is placed in a case or receiver, in which it is supported at a level higher than the burner. This reservoir is made removable, so that when taken out of its receiver and inverted it may be filled with oil through its valve, and when turned top side up again and inserted to its place in the receiver the latter is supplied with oil through the valve in the reservoir; and the invention consists in a catch combined with the reservoir and outer case, whereby the reservoir is locked in place by a vertical movement and without turning the reservoir, as will be hereinafter set forth.

Figure 1:
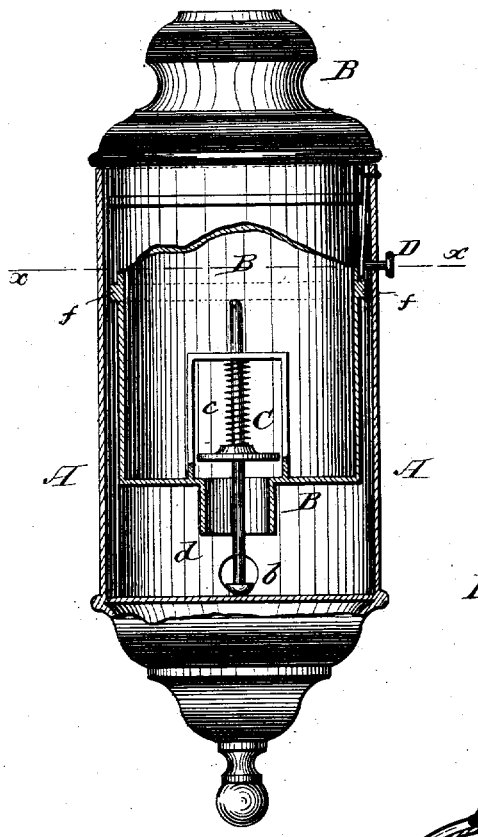
Figure 2:
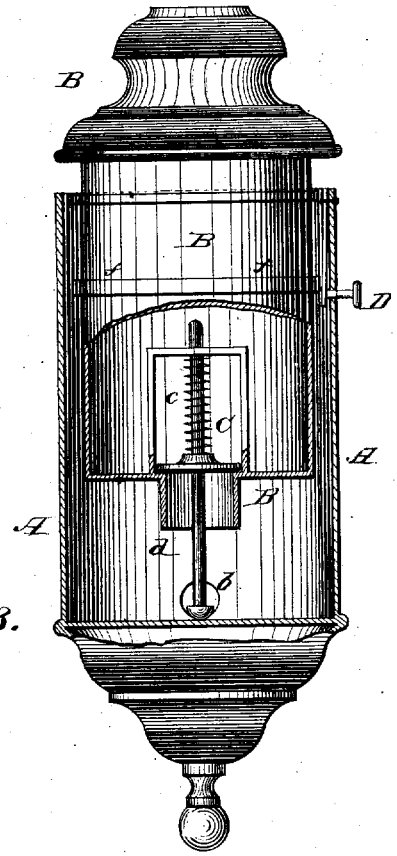
Figure 3:
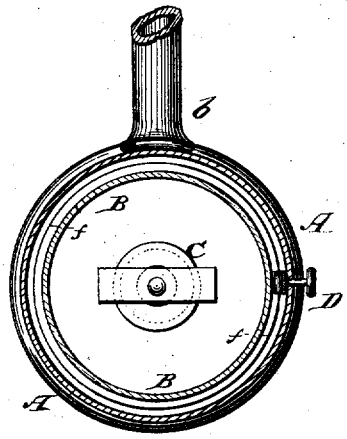

In the accompanying drawing, Figures 1 and 2 represent partly broken sectional elevations of a lamp reservoir and receiver in different positions as regards the reservoir, valve, and catch. Fig. 3 is a transverse section on line *x x*.

A is the receiver, which connects with the wick-tube of the lamp by an outlet, *b*. The receiver A may be of cylindrical construction, and receives freely down within it the reservoir B, which is withdrawn and inverted for filling through an opening covered by a valve, C, in its bottom. This valve, which may be a simple disk, or of any other suitable construction, has its closing action controlled by a spring—as, for. instance, by a spiral spring, *c*, arranged around an inner or back stem of the valve, and bearing at its one end against a bridge in the reservoir—so that, in commencing to withdraw the reservoir from the receiver, the valve is automatically closed, and kept tightly shut till purposely opened after the removed reservoir has been inverted for filling.

The filling may be effected by inserting the spout of the filling-can down within an overflow-cup, *d*, outside of the valve, and pressing the same against the valve so as to open it.

The valve C is automatically opened when the reservoir is inserted to its place within the receiver by causing the valve to come in contact with the receiver A—as, for instance, either by an outer extension of the valve striking the bottom of the receiver, as shown in the drawing, or by the face of the valve striking a fixed stem or projection within the receiver. This automatic opening and closing of the valve, however, is subject to the control of a catch applied to lock the reservoir when in place within the receiver, with the valve in the reservoir open, but so that when said catch is liberated to remove the reservoir the valve is automatically closed, to prevent the escape of oil from the reservoir when drawing the latter out from the receiver.

This catch may be variously constructed and applied. Thus, it may be a spring-catch or any other catch, and the male portion of it either be on the reservoir or on the receiver, and the female portion to correspond; but, for the purpose of illustration, a spring-catch or male portion, D, thereof, is here shown as applied to the receiver A, and so that the same is operated from the exterior of the receiver to automatically lock with the reservoir by overlapping a circular rib, *f*, on the reservoir when the latter is down to its place, but so that when said catch is withdrawn the reservoir B is free to be drawn up or to be thrown up by the valve-spring and the valve closed, as clearly shown in Fig. 2 of the drawing, after which the reservoir, having the valve closed, may be wholly removed from the receiver.

It will thus be seen that the reservoir is locked in place by simply pressing it down in the outer case.

Having thus fully described my invention, what I claim as new, and desire to secure by Letters Patent, is—

In combination with a case, A, and reservoir B, provided with a valve, a catch, D, and means to receive the catch, whereby the reservoir is automatically locked in place by a vertical movement of the same, substantially as and for the purpose set forth.

In testimony that I claim the foregoing I have hereunto set my hand.

BENNETT B. SCHNEIDER.

Witnesses:
FRANK C. RAUBS,
E. S. DINKS.